UNITED STATES PATENT OFFICE.

ITHAMAR F. EATON, OF BOSTON, MASSACHUSETTS, ASSIGNOR TO HIMSELF AND WILLIAM C. DUNHAM, OF SAME PLACE.

IMPROVED COMPOSITION TO PREVENT THE SLIPPING OF MACHINE-BELTS.

Specification forming part of Letters Patent No. 103,034, dated May 17, 1870.

*To all whom it may concern:*

Be it known that I, ITHAMAR F. EATON, of Boston, in the county of Suffolk and State of Massachusetts, have invented a new and useful Composition to be Applied to Machine-Belts, &c.; and I do hereby declare that the following is a description of my invention sufficient to enable those skilled in the art to practice it.

My invention has particular reference to a provision for preventing machine-belts from slipping upon their pulleys, as they incline to do when they become slack, the invention being also applicable to the peripheries of locomotive driving-wheels to prevent their slipping upon the rails.

My invention consists in a new composition, which I term an "Anti-Slip Composition," by application of which in a powdered or melted form machine-belts are caused to adhere to their pulleys, said composition being mainly composed of rosin, the rosin being melted up with soap and oil to give it the proper consistence.

The proportions of the respective ingredients are substantially as follows: To a pound of rosin I add one-quarter of a pound of common brown soap and one-half a gill of oil, placing the ingredients in a suitable kettle and melting them together, stirring them to thoroughly incorporate the whole. When thus melted and incorporated I pour the mixture into suitable molds, so that when cool it shall be formed into bars of convenient size to be used.

To treat the belt I hold the end of one of these bars to the inner surface of the belt, which grinds or melts off the composition, the removed part adhering to the belt and effectually preventing the pulley from slipping upon the surface thus treated or prepared.

The composition may be similarly applied directly to the surface of the pulley, but I generally prefer to make the application to the belt itself.

The composition does not in the least impair the flexibility of the belt, but on the contrary tends to preserve and improve it.

To adapt the composition for application to locomotive-wheels I add to the ingredients (combined in the proportions above set forth) one-half a pint of fine sand, incorporating the sand with the other ingredients, or coating one or more sides of each bar with the sand.

The oil used in the preparation of the composition imparts the requisite softness, and the soap lessens the viscidity of the composition and enables it to be cast into bars and easily worked.

For oil I prefer to use green olive or lard oil, but some other vegetable, animal or mineral oil may prove equally suitable.

I claim—

For preventing the slipping of belts, &c., the composition formed of the ingredients combined in the proportions and in the manner substantially as set forth.

Executed April 20, 1870.

ITHAMAR F. EATON.

Witnesses:
J. B. CROSBY,
FRANCIS GOULD.